(12) United States Patent
Abrams et al.

(10) Patent No.: US 11,341,032 B1
(45) Date of Patent: May 24, 2022

(54) TESTING IN A DISASTER RECOVERY COMPUTER SYSTEM

(71) Applicant: International Business Machines Corporation, Armonk, NY (US)

(72) Inventors: Robert M. Abrams, Wappinger Falls, NY (US); Marc Henri Coq, Hopewell Junction, NY (US); Desmond Fitzpatrick, Ossining, NY (US); Eugene Sale, Punta Gorda, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/118,738

(22) Filed: Dec. 11, 2020

(51) Int. Cl.
*G06F 11/00* (2006.01)
*G06F 11/36* (2006.01)

(52) U.S. Cl.
CPC ........ *G06F 11/3688* (2013.01); *G06F 11/368* (2013.01); *G06F 11/3664* (2013.01)

(58) Field of Classification Search
CPC ............. G06F 11/2023; G06F 11/3664; G06F 11/368; G06F 11/3688
See application file for complete search history.

(56) References Cited

U.S. PATENT DOCUMENTS

| | | | |
|---|---|---|---|
| 7,770,058 B2 | 8/2010 | Phan | |
| 9,037,928 B2 | 5/2015 | Kleveland et al. | |
| 9,274,903 B1* | 3/2016 | Garlapati | G06F 11/1658 |
| 9,336,103 B1* | 5/2016 | Hasbe | G06F 11/203 |
| 9,389,961 B1* | 7/2016 | Patankar | G06F 16/27 |
| 10,445,201 B2 | 10/2019 | Rathineswaran et al. | |
| 2010/0115328 A1* | 5/2010 | Betawar | G06F 11/263 714/4.1 |
| 2013/0111260 A1 | 5/2013 | Reddy et al. | |
| 2017/0168903 A1 | 6/2017 | Dornemann et al. | |
| 2018/0181473 A1* | 6/2018 | Shimogawa | G06F 11/008 |
| 2019/0073600 A1* | 3/2019 | Boshev | G06F 8/70 |
| 2019/0108110 A1 | 4/2019 | Rathineswaran et al. | |

(Continued)

OTHER PUBLICATIONS

J. Emigh, "Disaster Recovery Testing: Ensuring Your DR Plan Works", enterprisestorageforum.com/Data Backup & Recovery, May 28, 2019, 6 pages.

(Continued)

*Primary Examiner* — Joshua P Lottich
(74) *Attorney, Agent, or Firm* — Cantor Colburn LLP; Teddi Maranzano

(57) ABSTRACT

According to an aspect, a computer-implemented method includes configuring a disaster recovery computer system as a test environment of a mainframe computer system as a mirror image of a production environment, where the disaster recovery computer system is a backup of a primary production computer system. Test cases are executed in the test environment of the disaster recovery computer system. A stress and load impacts can be monitored on a plurality of computer system resources of the disaster recovery computer system based on execution of the test cases. The test environment can be disabled, and the disaster recovery computer system can be reconfigured as a production system based on a failure of the primary production computer system.

20 Claims, 7 Drawing Sheets

(56) References Cited

U.S. PATENT DOCUMENTS

2020/0334043 A1* 10/2020 Zlotnick ............. G06F 11/1469
2020/0334073 A1  10/2020 Lecrone et al.

OTHER PUBLICATIONS

R. Crawford, "Disaster recovery on the mainfram: New options for site recovery", SearchDataCenter.com, Jun. 6, 2007, 3 pages.
Technologent, "How DevOps Can Enable More Effective DR Planning", written by Technologent, Jan. 9, 2019, 4 pages.
Transmittal Form PTO/SB/21 signed Dec. 30, 2020.

* cited by examiner

TESTING IN A DISASTER RECOVERY COMPUTER SYSTEM

BACKGROUND

The present invention generally relates to computer systems, and more specifically, to computer systems, computer-implemented methods, and computer program products for testing in a disaster recovery computer system.

High availability computer systems typically use data replication to maintain a secondary copy of data stored in a primary volume. A systems complex, also referred to as a sysplex, is an example of a high-availability system that allows multiple logical partitions to communicate and coordinate synchronized data storage and access for large-scale data storage and management. A parallel sysplex provides data sharing capabilities for accessing multiple databases to read and write as shared data. A geographically dispersed parallel sysplex (GDPS) environment is an example of an environment that enables a parallel sysplex to be spread across geographically separate sites while maintaining coordinated data system management; however, the GDPS environment need not be geographically separated. A GDPS environment in combination with peer-to-peer remote copy (GDPS/PPRC) enables data mirroring using PPRC volume pairs (i.e., primary and secondary volumes) for systems that can be separated by substantial distances, e.g., 200 kilometers. PPRC is an example of a replication technology. In a multi-system configuration, GDPS/PPRC allows the systems at separate sites to be administered as a single system. In the event of a system or storage device failure, recovery can be initiated automatically with minimal or no data loss. Many other parallel sysplex configuration variations are known and may employ various approaches for high availability, such as asynchronous mirror technology without restrictions on distance.

A data center can include a variety of systems and servers running different operating systems and workloads in a production environment. A production environment refers to a deployed system running workloads under normal operating conditions as opposed to a test environment used to verify and validate new or updated software and/or hardware. Due to the processing loads of the production environment, testing of applications using production system resources can be limited so as to not simulate performance of the production environment. However, performing test operations, such as development tests, validation tests, acceptance tests, load and stress tests and the like on a separate development system may not reveal issues that can appear upon full integration into the production environment.

SUMMARY

Embodiments of the present invention are directed to testing using a disaster recovery computer system. According to an aspect, a computer-implemented method includes configuring a disaster recovery computer system as a test environment of a mainframe computer system as a mirror image of a production environment, where the disaster recovery computer system is a backup of a primary production computer system. Test cases are executed in the test environment of the disaster recovery computer system. A stress and load impacts can be monitored on a plurality of computer system resources of the disaster recovery computer system based on execution of the test cases. The test environment can be disabled, and the disaster recovery computer system can be reconfigured as a production system based on a failure of the primary production computer system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
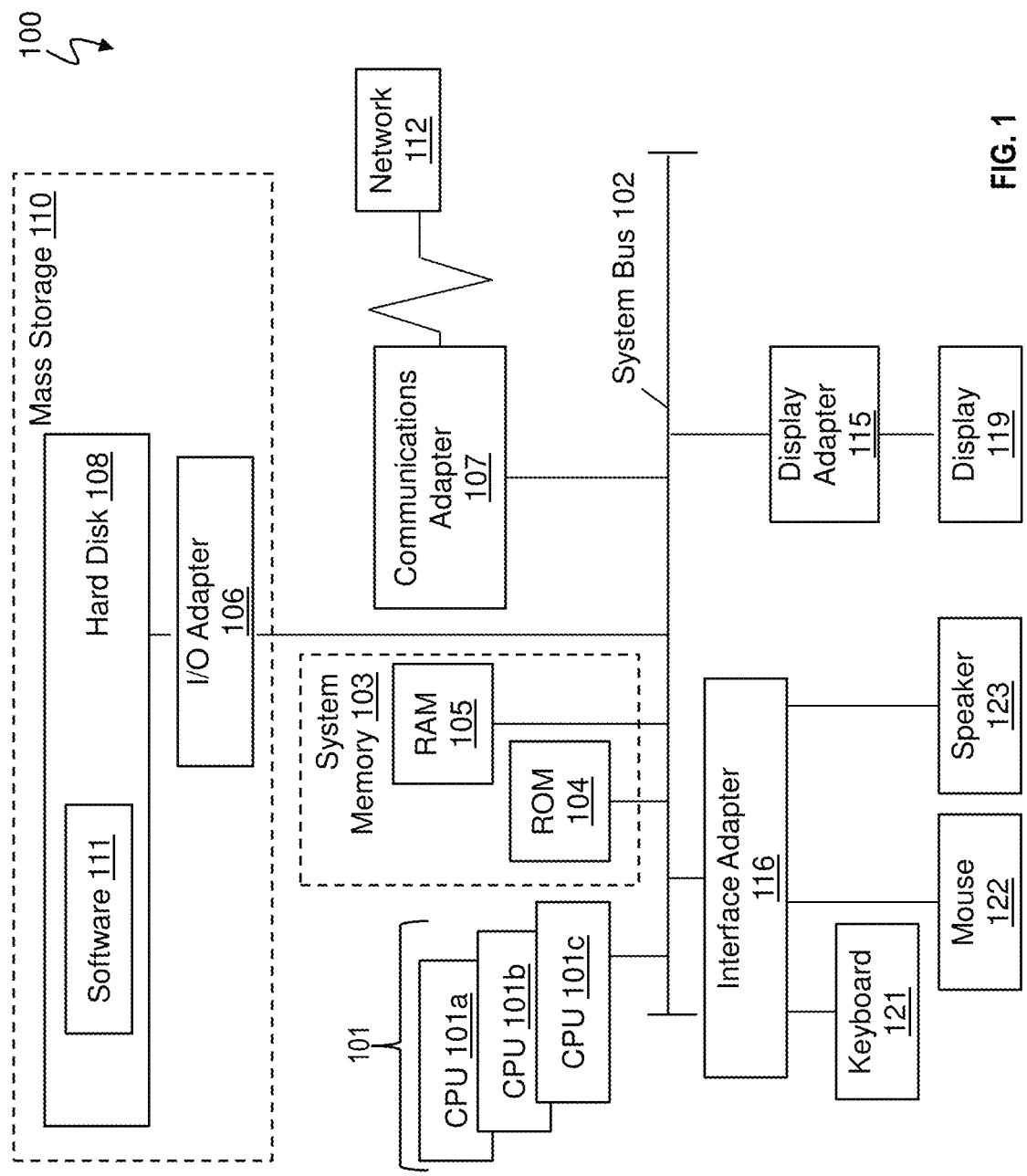
FIG. 1 depicts a block diagram of an example computer system for use in conjunction with one or more embodiments of the present invention.

One or more embodiments of the present invention are configured to perform testing, such as stress testing of a changed production system, using a disaster recovery computer system that provides a mirror image of the production system. At enterprise-scale, disruptions can be caused by defects, performance bottlenecks or other abnormalities that occur when changes are introduced, or when workloads increase above normal load rates. Such problems can be challenging to detect during application testing, as development systems typically cannot readily replicate the complexity of a large production environment. Performing development testing directly within a production environment is not typically feasible, as such testing may disrupt production systems if an error occurs. Further, test cases may require a system configuration in a failed state to test failure recovery logic, which could impact other normal operations within the production environment.

One or more embodiments can perform stress testing using a disaster recovery computer system that normally operates as a backup of a primary production computer system. This can uncover potential application issues and other scalability inhibitors to increase the resiliency of critical production systems. The disaster recovery computer system may normally operate at a reduced capacity sufficient to maintain copies of data from the primary production computer system and remain in a ready state, such that upon a failure of the primary production computer system, resources of the disaster recovery computer system can be provisioned and enabled to take over operation of a production environment while the primary production computer system is serviced. Embodiments can take advantage of the previously unused resources of the disaster recovery computer system while the disaster recovery computer system remains in a standby configuration with respect to the primary production computer system. A tertiary copy of backup data at the disaster recovery computer system can be created to serve as an equivalent of production data for stress testing of workloads, rather than using only simulated data and workloads. The tertiary copy of the backup data can also be modified to support test case execution in the test environment. The test environment can be isolated from the production environment of the primary production computer system and from the backup environment of the disaster recovery computer system to prevent tests from impacting normal and backup operation of the primary production computer system and the disaster recovery computer system.

The production system can mirror all changes to the disaster recovery computer system using, for example, data mirroring technology. Examples of data mirroring technology include IBM Metro Mirror and IBM Global Mirror. The tertiary data copy can be created based on the mirrored data. Isolation between the production environment and the test environment can be achieved using a firewall or other network-based isolation technique. Thus, workload processing on the production system does not reach the test environment running on the disaster recovery computer system. The scope of this disclosure is not limited to any computer hardware, operating systems, software, applications environment across an enterprise platform.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
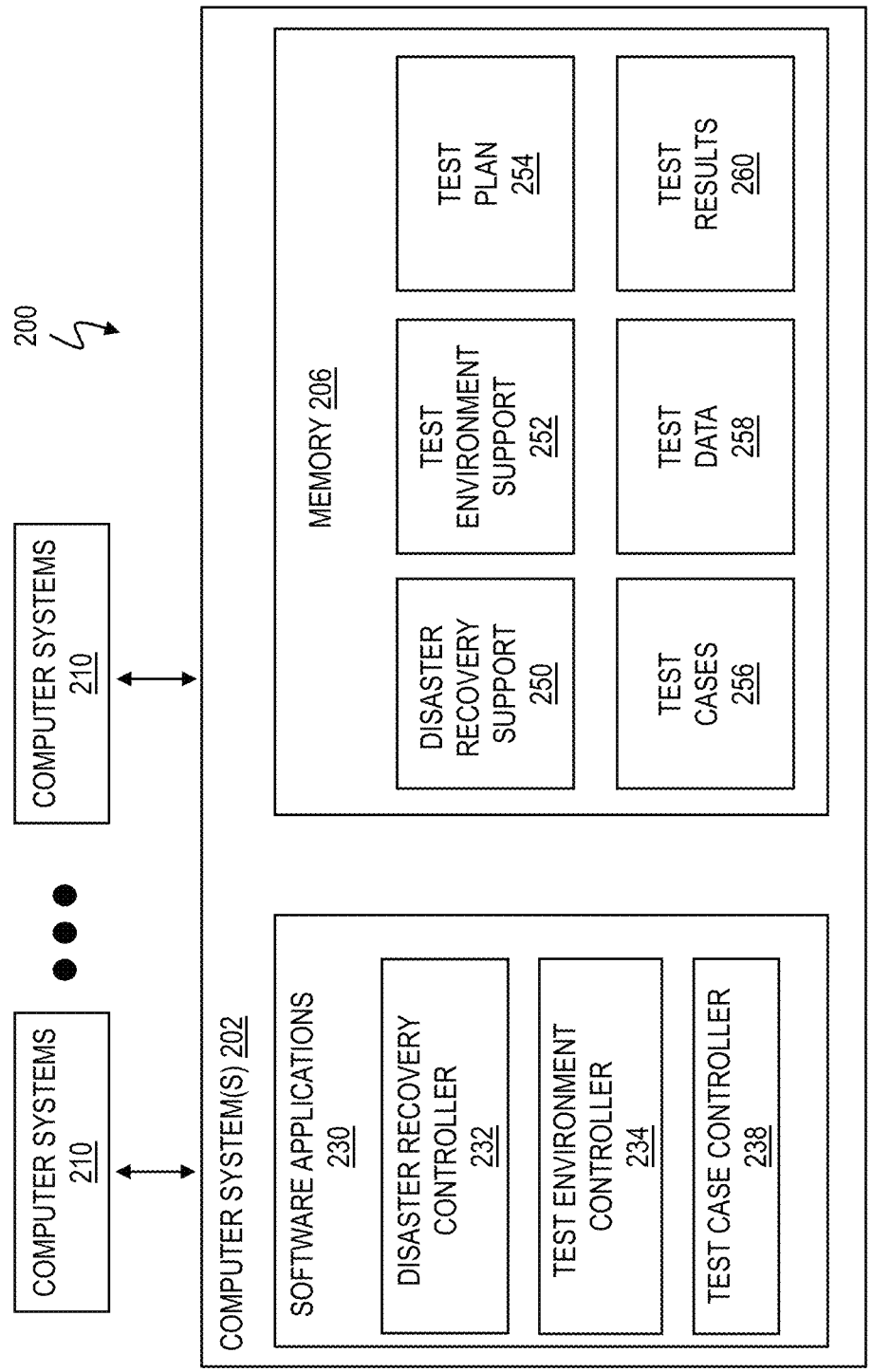
FIG. 2 is a block diagram of a system in accordance with one or more embodiments of the present invention.

FIG. 2 is a block diagram of a system 200 for disaster recovery management and test management in accordance with one or more embodiments of the present invention. FIG. 2 depicts one or more computer systems 202 coupled to one or more computer systems 210 via a wired, fiber, and/or wireless network. For example, computer system 202 can be representative of numerous computers in a datacenter servicing various users, and computer systems 210 can be representative of numerous computers in a datacenter. One or more of the computer systems 202 can be configured to collect data associated with the operation of one or more of the computer systems 210. The computer systems 210 may be observed to collect representative performance data and events during operation of the system 200. Elements of the computer system 100 of FIG. 1 may be used in and/or integrated into computer systems 202 and computer systems 210. As one example, one of the computer systems 210 can be a primary production computer system and one of the computer systems 210 can be a disaster recovery computer system. One or more of the computer systems 202 can manage disaster recovery operations between the primary production computer system and the disaster recovery computer system. One or more of the computer systems 202 can manage testing of one or more applications on the disaster recovery computer system using a test environment configured similar to the production environment of the primary production computer system.

In the example of FIG. 2, software applications 230 can include a disaster recovery controller 232, a test environment controller 234, and a test case controller 238. The software applications 230 may utilize and/or be implemented as software 111 executed on one or more processors 101, as discussed in FIG. 1. It will be understood that other software applications 230 can also be executed by the computer systems 202 beyond those depicted in the example of FIG. 2. Furthermore, the software applications 230 can be combined or further subdivided.

Memory 206 of the computer systems 202 can store, for example, a plurality of data sets, files, records, databases, or the like. For example, the memory 206 can include disaster recovery support 250, test environment support 252, test plan 254, test cases 256, test data 258, and test results 260. The disaster recovery support 250 can include data to support monitoring of the primary production computer system and switchover support for the disaster recovery controller 232 to adjust the operating mode of the disaster recovery computer system, such that the disaster recovery computer system can take over for the primary production computer system upon a failure of the primary production computer system. The test environment support 252 can include parameters set by the test environment controller 234 to configure a test environment according to the test plan 254. The test plan 254 can define various parameters for the test cases 256 and identify which values of test data 258 should be used for the test cases 256. The test plan 254 may also define a sequence for executing the test cases 256 by the test case controller 238. Test results 260 can capture the outcome of the test cases 256 and may indicate whether the test cases 256 completed as expected according to the test plan 254.

Figure 3:
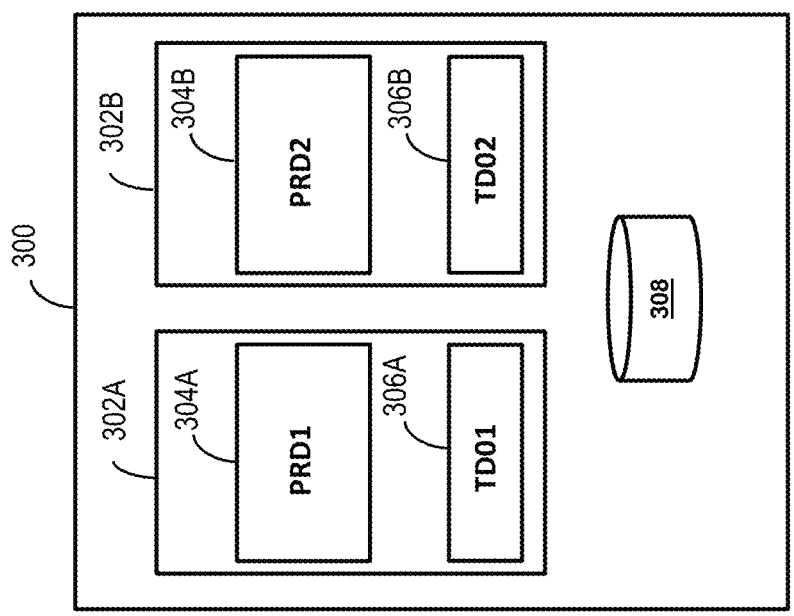
FIG. 3 is a block diagram of a computer system including production environment resources and test environment resources for use in conjunction with one or more embodiments of the present invention.

FIG. 3 depicts a block diagram of a computer system 300 including production environment resources and test environment resources. The computer system 300 is an example of a primary production computer system that can include computer system resources 302A, 302B with production environment resources 304A, 304B and test environment resources 306A, 306B. Under normal operating conditions, the test environment resources 306A, 306B may be allocated a reduced amount of the computer system resources 302A, 302B as compared to the production environment resources 304A, 304B, so that the production environment resources 304A, 304B can maintain a desired processing throughput. For example, the production environment resources 304A, 304B may have access to processing system resources capable of executing 10,000 million instructions-per-second (MIPS), while the test environment resources 306A, 306B may be allocated processing system resources capable of achieving 5,000 MIPS. As such, running test cases using the test environment resources 306A, 306B may not fully stress or load test the computer system resources 302A, 302B to the extent that would happen when a new or updated application is deployed in the production environment resources 304A, 304B along with existing workloads that may compete for resources, such as files or databases in production data 308. Test cases run using the test environment resources 306A, 306B may be prevented from accessing the production data 308 to avoid adverse interactions or corruption of the production data 308. While simulated data and workloads may be adequate for some test cases, the simulated data and workloads may not fully replicate conditions that can occur in combination with production workloads using the production environment resources 304A, 304B and interacting with the production data 308.

Figure 4:
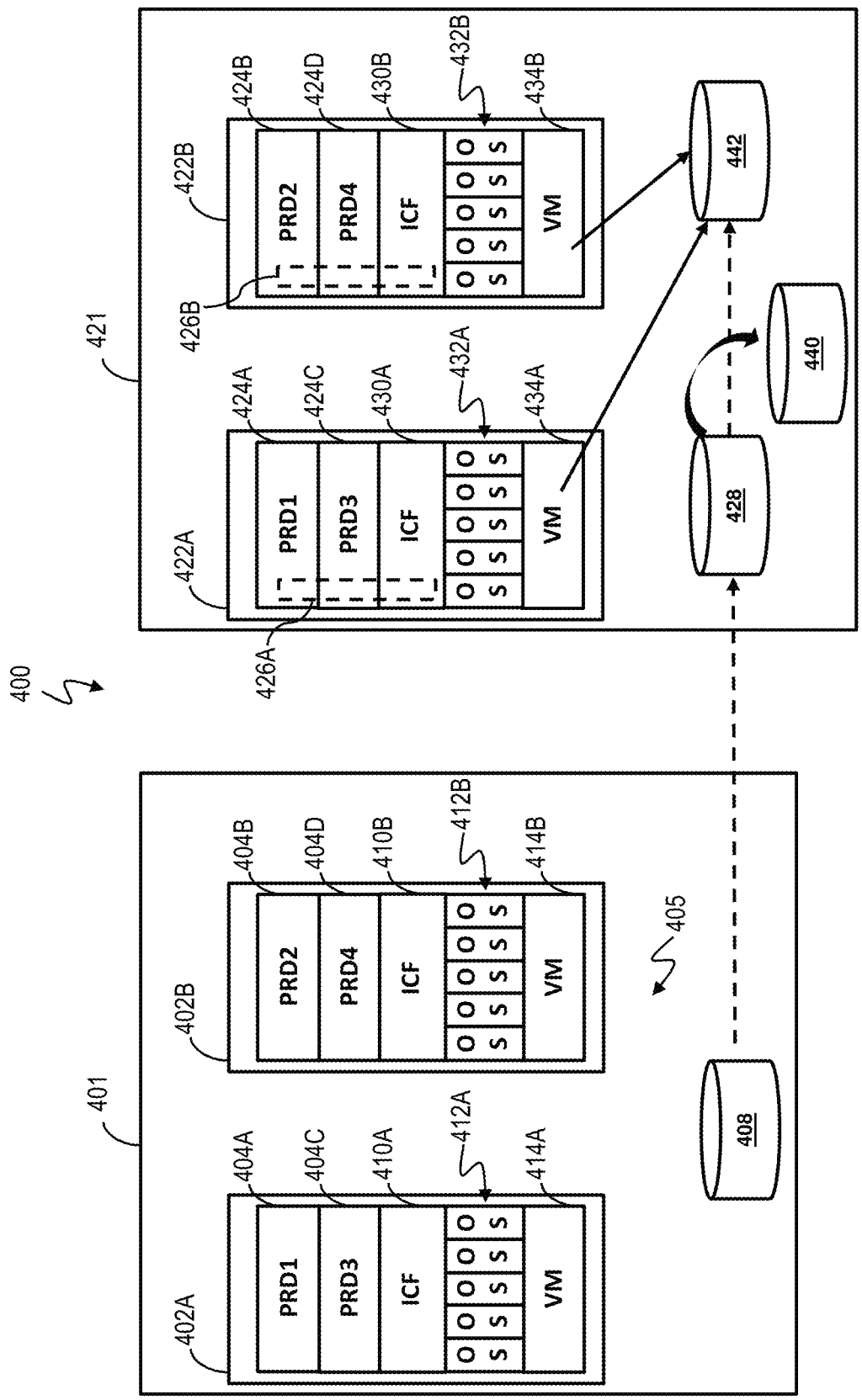
FIG. 4 depicts an example of a primary production computer system and a disaster recovery computer system in accordance with one or more embodiments of the present invention.

FIG. 4 depicts an example of a system 400 that includes a primary production computer system 401 and a disaster recovery computer system 421, where the primary production computer system 401 and disaster recovery computer system 421 can each be a mainframe computer system. In the example of FIG. 4, the primary production computer system 401 can include computer resources 402A, 402B with production environment resources 404A, 404B, 404C, 404D. The primary production computer system 401 can also include internal coupling facility 410A, 410B to allow multiple partitions, e.g., logical partitions (LPARs), to run multiple operating systems 412A, 412B to manage data and distribute workloads. The primary production computer system 401 can also include virtual machines 414A, 414B to support operations on processors (e.g., processors 101 of FIG. 1) and memory systems (e.g., system memory 103 of FIG. 1) without requiring specific knowledge of low-level interfaces and configurations by the operating systems 412A, 412B. The primary production computer system 401 also includes production data 408 that can be stored on one or more instances of mass storage 110 of FIG. 1. The production data 408 is updated as various workloads executing on the production environment resources 404A, 404B, 404C, 404D write files or records to the production data 408.

To maintain a high-level of availability, the disaster recovery computer system 421 can be implemented as a backup system for the primary production computer system 401. The disaster recovery computer system 421 may be geographically separated from the primary production computer system 401, such that a common physical or environmental event is less likely to impact both systems. Similar to the primary production computer system 401, the disaster recovery computer system 421 can be provisioned to include computer resources 422A, 422B with production environment resources 424A, 424B, 424C, 424D, internal coupling facility 430A, 430B, operating systems 432A, 432B, and virtual machines 434A, 434B. The disaster recovery computer system 421 can also include a continuous backup copy 428 of production data 408.

The computer resources 422A, 422B of disaster recovery computer system 421 can be configured to run in a reduced resource configuration until the disaster recovery controller 232 of FIG. 2 detects a failure at the primary production computer system 401. Rather than waiting idly for a switchover, the test environment controller 234 of FIG. 2 can configure the disaster recovery computer system 421 as a test environment 426A, 426B based on a production environment 405 of the primary production computer system 401 replicated at the disaster recovery computer system 421, creating a mirror image of the production system. The disaster recovery computer system 421 can also make a secondary backup 440 of the backup copy 428 in case an error in the production data 408 is propagated to the backup copy 428 or if the backup copy 428 is inaccessible. For instance, the secondary backup 440 may be copied at a slower update rate than the backup copy 428. The test environment controller 234 of FIG. 2 can initiate a replication of the backup copy 428 as a tertiary copy 442. The virtual machines 434A, 434B can be configured to interface with the tertiary copy 442 during testing such that the tertiary copy 442 becomes test data on the disaster recovery computer system 421. Further details are provided with respect to FIG. 5.

Figure 5:
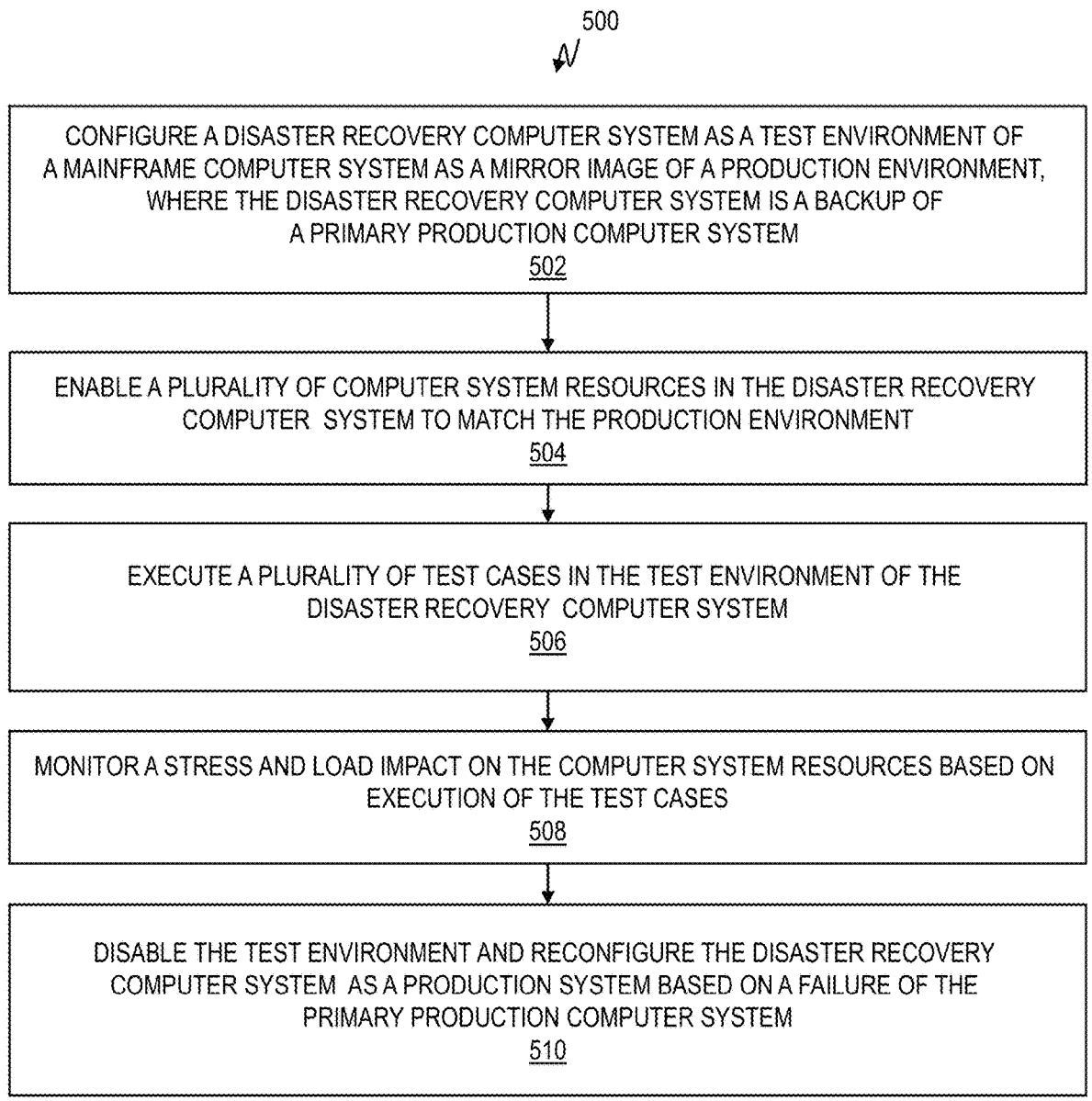
FIG. 5 is a flowchart of testing in a disaster recovery computer system in accordance with one or more embodiments of the present invention.

FIG. 5 is a flowchart 500 of performing testing on a disaster recovery computer system according to an embodiment. The flowchart 500 is described in reference to FIGS. 1-5 and may include additional steps not depicted in FIG. 5. Although depicted in a particular order, the blocks depicted in FIG. 5 can be rearranged, subdivided, and/or combined. At block 502, a disaster recovery computer system 421 is configured as a test environment 426A, 426B of a mainframe computer system as a mirror image of a production environment 405, where the disaster recovery computer system 421 is a backup of a primary production computer system 401. The mirror image of the production environment 405 can be defined in terms of processing resource configuration, database configuration, and various subsystem configurations. The test environment 426A, 426B can be isolated from the production environment 405 of the primary production computer system 401 using network isolation techniques. The production environment 405 can include a plurality of operating systems 412A, 412B and applications configured to execute in parallel. Configuring the disaster recovery computer system 421 as the test environment 426A, 426B of a mainframe computer system can include enabling one or more of the computer system resources 422A, 422B of the disaster recovery computer system 421 to match the production environment 405 of the primary production computer system 401.

At block 504, a plurality of computer system resources 422A, 422B is enabled in the disaster recovery computer system 421 to match the production environment 405.

At block 506, a plurality of test cases 256 is executed in the test environment 426A, 426B of the disaster recovery computer system 421. The test cases 256 can include one or more applications in a test configuration prior to deployment in the production environment 405 of the primary production computer system 401.

At block 508, a stress and load impact on a plurality of computer system resources 422A, 422B of the disaster recovery computer system 421 based on execution of the test cases 256 is monitored. The test environment 426A, 426B can be configured to inject one or more failure conditions into one or more of the test cases 256. The test case controller 238 can verify whether an expected response to the one or more failure conditions is observed upon executing one or more of the test cases 256 based on analyzing the test results 260 with respect to the test plan 254.

At block 510, the test environment 426A, 426B is disabled, and the disaster recovery computer system 421 is reconfigured as a production system based on a failure of the primary production computer system 401. While the disaster recovery computer system 421 is configured as a production system, the test environment 426A, 426B can remain disabled. Upon restoring the primary production computer system 401, the disaster recovery computer system 421 can revert to a backup system, and the test environment 426A, 426B can be enabled to resume testing.

The disaster recovery computer system 421 is a mirror image of production system 401, and can include a backup copy 428 of production data 408 of the primary production computer system 401. Part of configuring the disaster recover computer system 421 as a test environment 426A, 426B can include making a tertiary copy 442 of the production data 408. The tertiary copy 442 can be updated based on test data 258 associated with the test cases 256. A plurality of jobs can be executed against the updated tertiary copy 442. One or more of the test cases 256 can be executed while the jobs are executing against the updated tertiary copy 442. The tertiary copy 442 can include database schemes and representative data that may not otherwise be available during typical testing in configurations such as the computer system 300 of FIG. 3. For example, database update jobs can be executed against the tertiary copy 442 of a production database. Execution of test cases 256 can include scenarios such as updates and application accesses performed against a changed database copy to facilitate testing at scale with a multitude of test scenarios in the test environment 426A, 426B running in the disaster recovery computer system 412. The test environment 426A, 426B can be initialized, data migrated to a new database schema, and a new application initialized for testing in the test environment 426A, 426B.

In some embodiments, artificial intelligence or machine learning tools can be used to examine failure data and generate one or more of the test cases 256 and test data 258 to test for similar failure conditions in existing applications or new/updated applications. Test cases 256 can be targeted for multiple types of tests, such as unit tests, integration tests, verification tests, validation tests, acceptance tests, compliance tests, regression tests, guard-band tests, and other types of tests according to the test plan 254. The test cases 256 can also be used to test system components at various levels, such as applications, middleware, operating systems, virtual machines, and physical hardware. Existing system features of data mirroring, and on/off capacity-on-demand can be used to support testing with production data or a modified version of production data. Tokens can be used to manage computer system resource capacity available for testing. Aspects of the test environment controller 234 and test case controller 238 can be deployed as cloud services.

Technical advantages and benefits include enhanced test case coverage while not impacting the performance of a primary production computer system. By using idle resources of a disaster recovery computer system for testing, more robust test cases can be developed, and more accurate load testing and stress testing can be achieved. For example, a typical test environment may only have 10% to 20% of system resources available as compared to a production environment. Using a disaster recovery computer system for testing can greatly improve resource availability for testing and isolates a testing environment from a production environment. Embodiments can enable load/stress testing of production workloads in an environment that is a mirror-image of the production environment in terms of MIPS/scale, LPARs, subsystems, subsystem configurations, data, and data center environmental conditions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Testing as a Service (TaaS): the capability to identify/address service issues by testing different workloads at scale and under various conditions.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
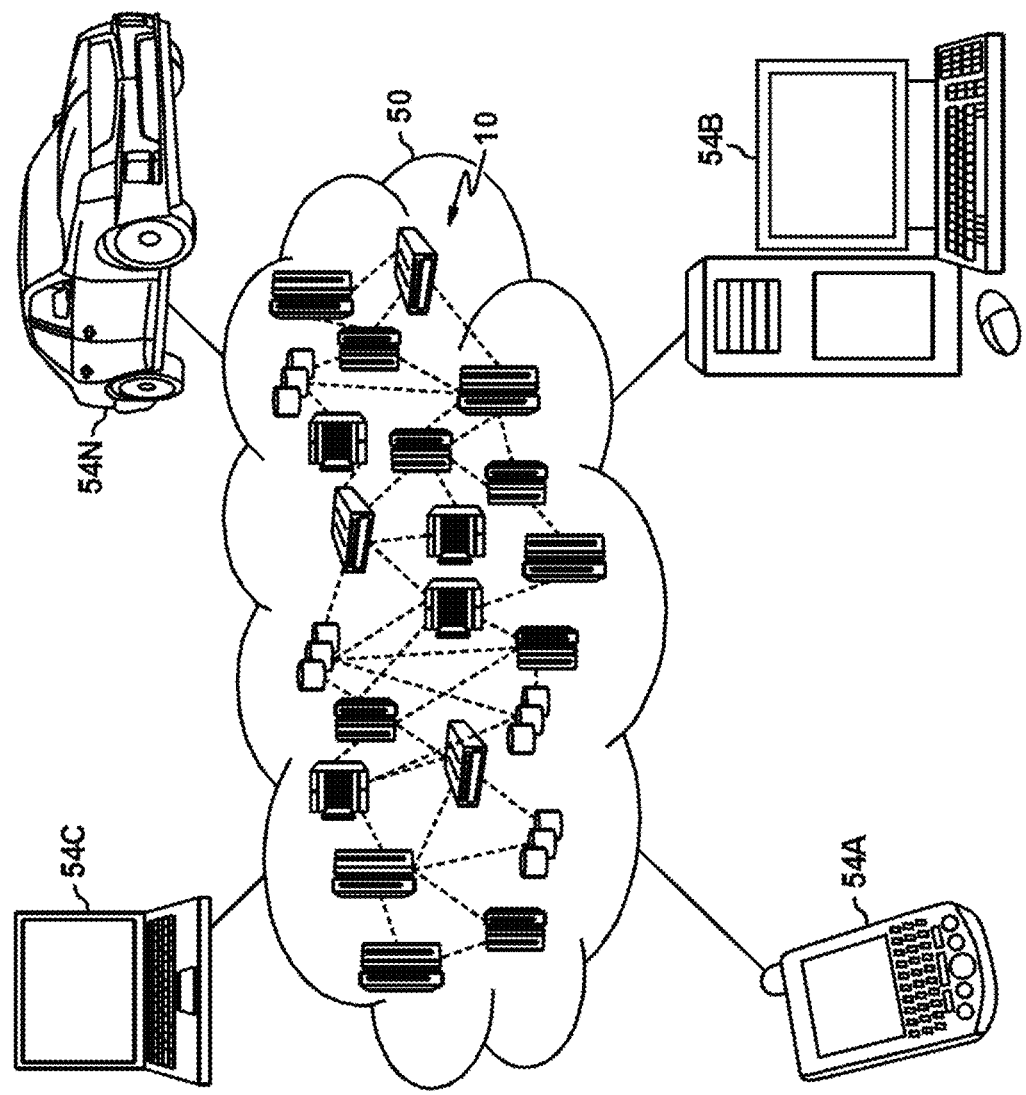
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
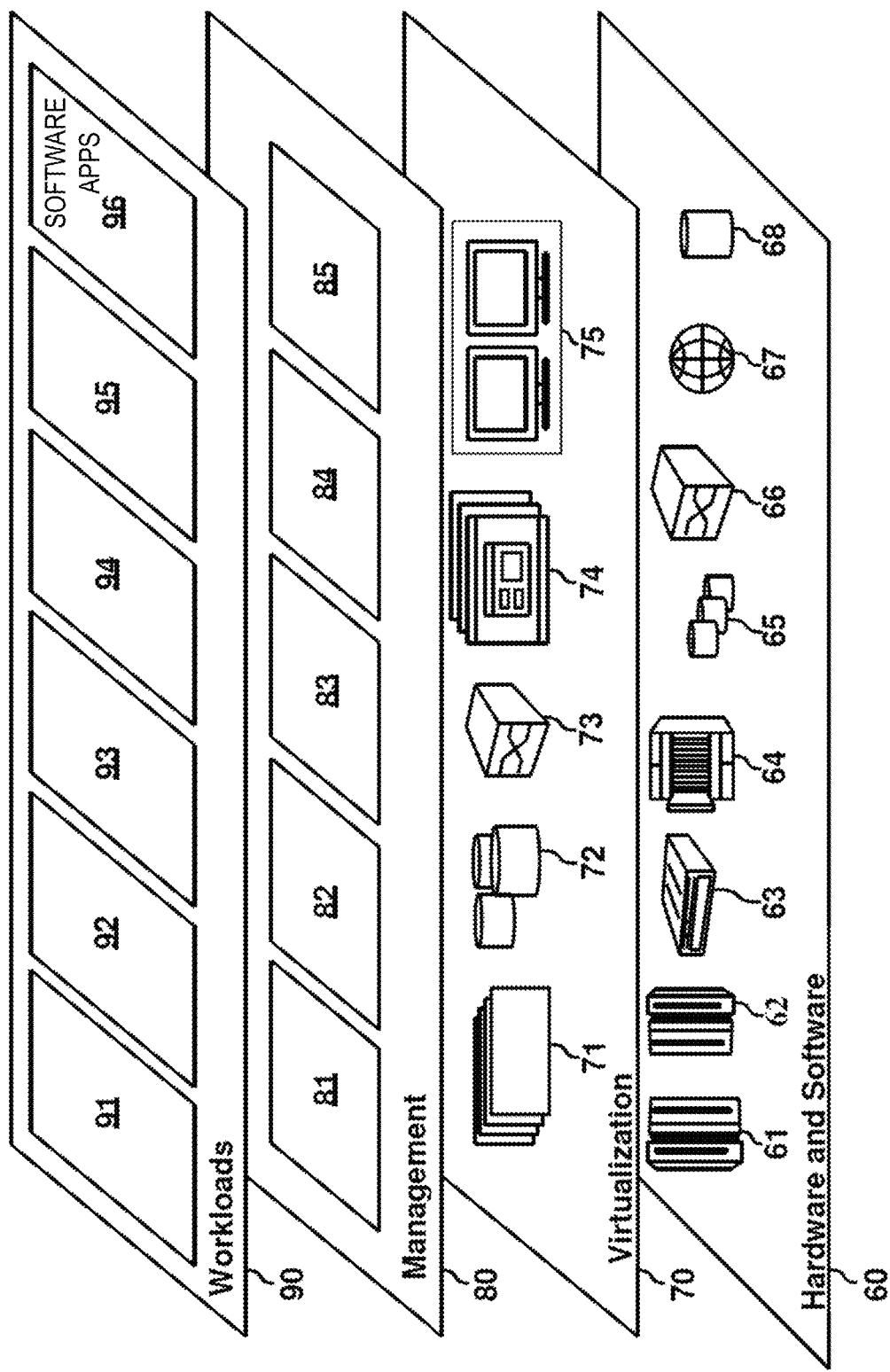
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 230 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    configuring a disaster recovery computer system as a test environment of a mainframe computer system, the disaster recovery computer system comprising a mirror image of a production environment, wherein the disaster recovery computer system is a backup of a primary production computer system;
    accessing a test plan to determine one or more values of test data to use for a plurality of test cases and a sequence of executing the test cases, wherein the test plan defines a plurality of parameters to configure the test environment of the disaster recovery computer system;
    executing the test cases in the test environment of the disaster recovery computer system based on the test plan to perform stress and load testing in combination with a plurality of production workloads executing in the test environment of the disaster recovery computer system;
    monitoring a stress and load impact on a plurality of computer system resources of the disaster recovery computer system based on execution of the test cases; and
    disabling the test environment and reconfiguring the disaster recovery computer system as a production system based on a failure of the primary production computer system.

2. The computer-implemented method of claim 1, wherein the disaster recovery computer system comprises a backup copy of production data of the primary production computer system, and the method further comprises making a secondary backup copy of the backup copy and a tertiary copy of the production data, wherein the secondary backup copy is copied at a slower update rate than the backup copy and is used in place of the backup copy in case of an error.

3. The computer-implemented method of claim 2, further comprising:
    updating the tertiary copy based on test data associated with the test cases;
    executing a plurality of jobs against the updated tertiary copy; and
    executing one or more of the test cases while the jobs are executing against the updated tertiary copy.

4. The computer-implemented method of claim 1, wherein the production environment comprises a plurality of operating systems and applications configured to execute in parallel.

5. The computer-implemented method of claim 1, wherein the test cases comprise one or more applications in a test configuration prior to deployment in the production environment of the primary production computer system, and the test environment is isolated from the production environment of the primary production computer system.

6. The computer-implemented method of claim 1, wherein configuring the disaster recovery computer system as the test environment of the mainframe computer system comprises enabling one or more of the computer system resources of the disaster recovery computer system to match the production environment of the primary production computer system.

7. The computer-implemented method of claim 1, further comprising:
    configuring the test environment to inject one or more failure conditions into one or more of the test cases; and
    verifying whether an expected response to the one or more failure conditions is observed upon executing the one or more of the test cases.

8. A system comprising:
    a memory having computer readable instructions; and
    one or more processors for executing the computer readable instructions, the computer readable instructions controlling the one or more processors to perform operations comprising:
        configuring a disaster recovery computer system as a test environment of a mainframe computer system, the disaster recovery computer system comprising as a mirror image of a production environment, wherein the disaster recovery computer system is a backup of a primary production computer system;
        accessing a test plan to determine one or more values of test data to use for a plurality of test cases and a sequence of executing the test cases, wherein the test plan defines a plurality of parameters to configure the test environment of the disaster recovery computer system;

executing the test cases in the test environment of the disaster recovery computer system based on the test plan to perform stress and load testing in combination with a plurality of production workloads executing in the test environment of the disaster recovery computer system;

monitoring a stress and load impact on a plurality of computer system resources of the disaster recovery computer system based on execution of the test cases; and disabling the test environment and reconfiguring the disaster recovery computer system as a production system based on a failure of the primary production computer system.

9. The system of claim 8, wherein the disaster recovery computer system comprises a backup copy of production data of the primary production computer system, and configuring the disaster recovery computer system as the test environment comprises making a secondary backup copy of the backup copy and a tertiary copy of the production data, wherein the secondary backup copy is copied at a slower update rate than the backup copy and is used in place of the backup copy in case of an error.

10. The system of claim 9, wherein the computer readable instructions control the one or more processors to perform operations comprising:

updating the tertiary copy based on test data associated with the test cases;

executing a plurality of jobs against the updated tertiary copy; and executing one or more of the test cases while the jobs are executing against the updated tertiary copy.

11. The system of claim 8, wherein the production environment comprises a plurality of operating systems and applications configured to execute in parallel.

12. The system of claim 8, wherein the test cases comprise one or more applications in a test configuration prior to deployment in the production environment of the primary production computer system, and the test environment is isolated from the production environment of the primary production computer system.

13. The system of claim 8, wherein configuring the disaster recovery computer system as the test environment of the mainframe computer system comprises enabling one or more of the computer system resources of the disaster recovery computer system to match the production environment of the primary production computer system.

14. The system of claim 8, wherein the computer readable instructions control the one or more processors to perform operations comprising:

configuring the test environment to inject one or more failure conditions into one or more of the test cases; and verifying whether an expected response to the one or more failure conditions is observed upon executing the one or more of the test cases.

15. A computer program product comprising a non-transitory computer readable storage medium having program instructions embodied therewith, the program instructions executable by one or more processors to cause the one or more processors to perform operations comprising:

configuring a disaster recovery computer system as a test environment of a mainframe computer system, the disaster recovery computer system comprising a mirror image of a production environment, wherein the disaster recovery computer system is a backup of a primary production computer system;

accessing a test plan to determine one or more values of test data to use for a plurality of test cases and a sequence of executing the test cases, wherein the test plan defines a plurality of parameters to configure the test environment of the disaster recovery computer system;

executing the test cases in the test environment of the disaster recovery computer system based on the test plan to perform stress and load testing in combination with a plurality of production workloads executing in the test environment of the disaster recovery computer system;

monitoring a stress and load impact on a plurality of computer system resources of the disaster recovery computer system based on execution of the test cases; and disabling the test environment and reconfiguring the disaster recovery computer system as a production system based on a failure of the primary production computer system.

16. The computer program product of claim 15, wherein the disaster recovery computer system comprises a backup copy of production data of the primary production computer system, and configuring the disaster recovery computer system as the test environment comprises making a secondary backup copy of the backup copy and a tertiary copy of the production data, wherein the secondary backup copy is copied at a slower update rate than the backup copy and is used in place of the backup copy in case of an error.

17. The computer program product of claim 16, wherein the program instructions executable by the one or more processors cause the one or more processors to perform operations comprising:

updating the tertiary copy based on test data associated with the test cases;

executing a plurality of jobs against the updated tertiary copy; and executing one or more of the test cases while the jobs are executing against the updated tertiary copy.

18. The computer program product of claim 15, wherein the test cases comprise one or more applications in a test configuration prior to deployment in the production environment of the primary production computer system, and the test environment is isolated from the production environment of the primary production computer system.

19. The computer program product of claim 15, wherein configuring the disaster recovery computer system as the test environment of the mainframe computer system comprises enabling one or more of the computer system resources of the disaster recovery computer system to match the production environment of the primary production computer system.

20. The computer program product of claim 15, wherein the program instructions executable by the one or more processors cause the one or more processors to perform operations comprising:

configuring the test environment to inject one or more failure conditions into one or more of the test cases; and verifying whether an expected response to the one or more failure conditions is observed upon executing the one or more of the test cases.

\* \* \* \* \*